United States Patent [19]

Muntjanoff et al.

[11] 4,093,241
[45] June 6, 1978

[54] PUSH-PULL CABLE AND ROD ASSEMBLY WITH SEAL

[75] Inventors: John Richard Muntjanoff, Aurora; Ivan Richard Lamport, Peoria, both of Ill.

[73] Assignee: Caterpillar Tractor Co., Peoria, Ill.

[21] Appl. No.: 771,505

[22] Filed: Feb. 24, 1977

[51] Int. Cl.² ............................ F16J 15/32; F16C 1/10
[52] U.S. Cl. ...................................... 277/24; 277/35; 277/110; 277/152; 74/502
[58] Field of Search .............. 277/123, 24, 102, 110, 277/111, 152, 157, 35, 165, 207 R; 74/503, 501 R, 501.5, 502

[56] References Cited

U.S. PATENT DOCUMENTS

| 1,006,114 | 10/1911 | McMullen | 277/19 X |
|---|---|---|---|
| 2,048,398 | 7/1936 | Lasker | 74/501 X |
| 2,083,937 | 6/1937 | Begg | 74/501 |
| 2,234,623 | 3/1941 | Crouse | 74/502 |
| 2,351,362 | 6/1944 | Parker | 277/110 X |
| 2,567,527 | 9/1951 | Parks | 277/110 |
| 2,769,352 | 11/1956 | Elliott | 74/503 X |
| 3,063,303 | 11/1962 | Cadwallader | 74/501 X |
| 3,239,247 | 3/1966 | Pickert | 277/110 X |
| 3,275,331 | 9/1966 | Mastrobattista et al. | 277/152 X |
| 4,039,197 | 8/1977 | Schmidt | 277/24 |

FOREIGN PATENT DOCUMENTS

| 369,322 | 6/1963 | Switzerland | 74/502 |
|---|---|---|---|
| 200,159 | 7/1923 | United Kingdom | 74/502 |
| 696,352 | 8/1953 | United Kingdom | 277/110 |
| 727,099 | 3/1955 | United Kingdom | 277/35 |

Primary Examiner—Robert S. Ward, Jr.
Attorney, Agent, or Firm—Phillips, Moore, Weissenberger, Lempio & Majestic

[57] ABSTRACT

A push-pull rod assembly is provided with a housing for the push rod and a seal formed in a capsule readily fixable to a fitting associated with the housing. In one embodiment the housing is formed with a flared end while the fitting, which has a threaded outer surface, is formed with an interior bore therethrough and an axially intersecting cone shaped bore adapted to engage the outer flared surface of the housing. The bore sealing capsule carries an elastomeric seal to sealingly surround a push rod extending outwardly of the housing while the capsule is threadably engaged with the fitting. The capsule is formed with a frustoconical projection axially centered at the base of an interior threaded socket to engage the interior of the flared end of the housing.

In the second embodiment the push rod is specially coated with an inert synthetic resin having a low coefficient of friction. The sealing means which is contained in a capsule threadably engaged on a fitting fixedly associated with the push rod housing includes an elastomeric member or the like and a metallic scraper to remove dirt and ice from the specially surfaced push rod.

15 Claims, 6 Drawing Figures

U.S. Patent June 6, 1978 Sheet 1 of 2 4,093,241
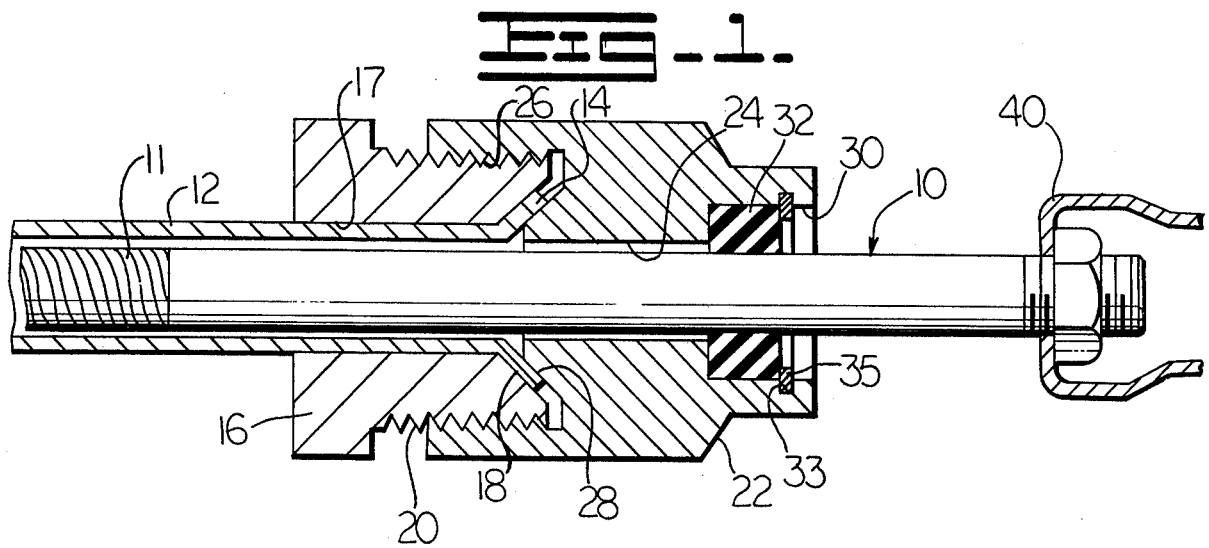
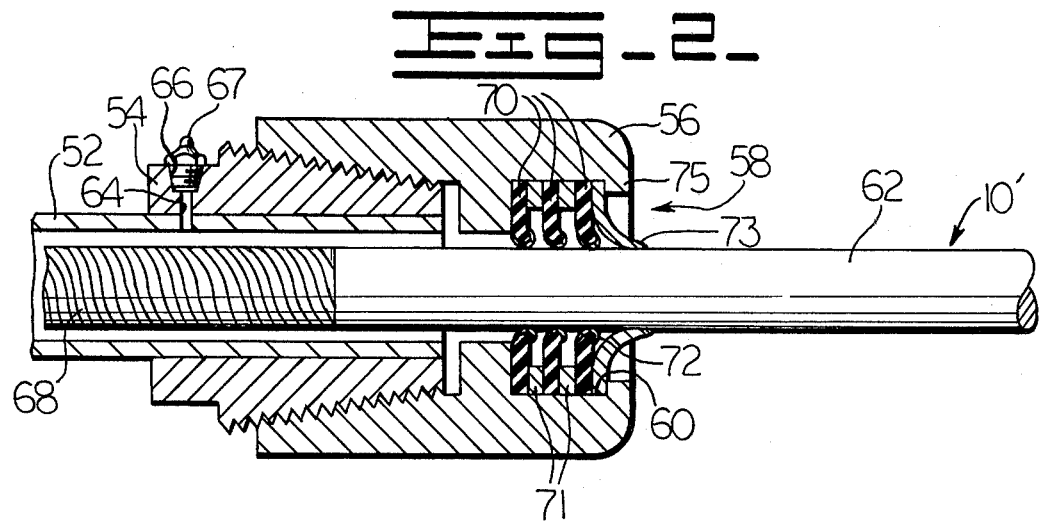
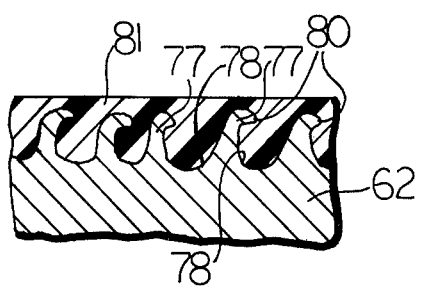
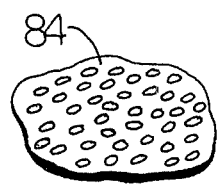

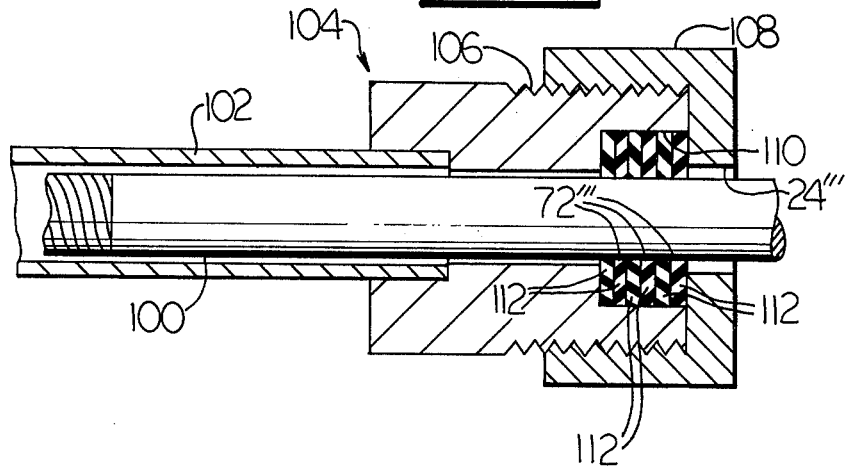
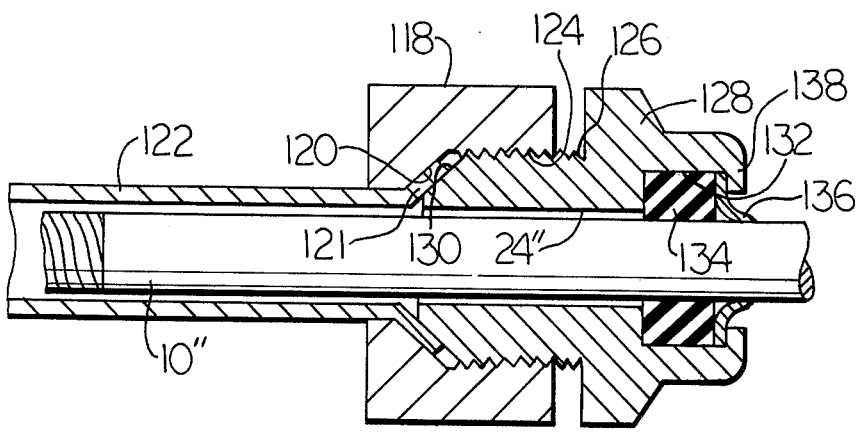

PUSH-PULL CABLE AND ROD ASSEMBLY WITH SEAL

BACKGROUND OF THE INVENTION

This invention relates to a sealing means for a control cable such as a push-pull cable and rod assembly which includes a push rod mountable remote from a device which is to be controlled by an operator at the remote site. In particular, it relates to a sealing capsule for a push rod associated with a control panel, the rod affixed to the end of a push-pull cable carried in a housing for control of a device such as an engine accessory in a vehicle or the like.

Push-pull cables are utilized quite frequently in the construction of equipment, particularly heavy earth working equipment to control the various engine and auxillary components of the vehicle. Operation of heavy equipment and the like results in dirt, and dust, and in freezing conditions ice settling on and about all portions of the equipment. Continued movement of push rods affixed to push-pull cables through fittings associating the control cable with an instrument panel causes wear and eventual failure in the sealing means associated with the push-pull cable fitting. In addition to failure of the sealing means, dirt, dust, ice and other deleterious material can work into the housing to cause early failure of the cable section of the push-pull cable. Accordingly, it is extremely important to keep the housing clear of foreign materials which may abrade or corrode the push-pull cable. In the past it has been the practise to provide push-pull cables as an assembled unit complete with housings and seals so that failure of the seal required complete replacement of the entire housing and the cable. This has proved burdensome and expensive to the operator.

One of the problems in push-pull cable assemblies is the removal of ice formed about the push rod portion extending outwardly of the fitting and cable housing. The problem has been so severe in the past that vehicle operation may be degraded. Normal elastomeric seals used to prevent dirt, dust and liquids from entering the housing have proved inadequate to remove ice since the ice will tear away the elastomeric seal. The addition of metal scrapers to the push rod seal assembly is in part satisfactory; however, when the ice is heavy and completely surrounds the push rod it is difficult if not impossible to break away the ice from the push rod by conventional scraper methods.

In addition to the above problems push-pull cable assemblies have been formed so that oil can be retained in the housing to prevent corrosion and reduce problems caused by dirt and other deleterious material reaching the interior of the housing. Since the affixed cable to the push rod of the push-pull cable assembly generally has a smaller diameter than the push rod itself, motion of the push rod in and out of the housing through the seal may act to "pump" the oil outwardly of the assembly, particularly if the oil is inserted with the push rod in the extended position. This "pumping" may introduce air and other matter into the push rod assembly with problems ensuing therefrom.

SUMMARY OF THE INVENTION

Accordingly this invention provides a seal capsule for a push-pull cable assembly which is readily replaceable in the field. Furthermore, a second embodiment, which includes the limitations of the replaceable seal capsule, provides for a scraper to remove ice and dirt from the push rod portion of the push-pull assembly. The invention further provides for a synthetic resin coating of the push rod assembly, the resin having a low coefficient of friction of a type such as Teflon. The invention includes means for inserting oil into a push-pull cable housing to lubricate and to prevent corrosion of the cable itself. A method is described for forming the push rod portion of the push-pull cable assembly with the special coating of the synthetic resin material.

It is an object of this invention to provide a replaceable seal capsule for a push-pull cable.

It is a further object of this invention to provide a replaceable seal capsule for a push-pull cable having a special coating of synthetic resin to give the push-pull rod a low coefficient of friction.

It is still another object of this invention to provide a seal capsule for a push-pull cable assembly having a metallic scraper incorporated therein.

It is still another object of this invention to provide a push-pull cable assembly in which oil may be introduced into the cable housing.

It is another object of this invention to provide a method of forming the push rod portion of the push-pull cable assembly.

Broadly stated the invention is a sealing cap assembly for a control cable system, the control cable disposed in a cylindrical housing, the seal cap assembly comprising rod means affixed to the cable and disposed axially in said housing extending outwardly therefrom for axial movement relative the housing. A first member is rigidly associated with the housing proximate one end thereof. Sealing means are removably associated with the first member for sealingly associating the rod means with the cylindrical housing so that the rod means are movable therethrough.

These objects and other objects will become apparent from the study of the attached drawings and the following specification.

BRIEF DESCRIPTION OF THE DRAWINGS

FIG. 1 illustrates the sealing capsule of this invention;

FIG. 2 illustrates a sealing capsule of the form envisioned by this invention for use with a specially formed push rod of the push-pull cable assembly;

FIG. 3 is a representative sectional view of the push rod shown in FIG. 2 showing the special surfacing formed thereon;

FIG. 4 is a representation of a second specially surfaced push-pull rod which would be usable in the capsule illustrated in FIG. 2;

FIG. 5 is an alternate embodiment of the sealing capsule;

FIG. 6 is another embodiment of the sealing capsule.

DETAILED DESCRIPTION OF THE VARIOUS EMBODIMENTS

Referring to FIG. 1, a push-pull cable assembly is shown in part. Particularly a push-pull cable assembly for mounting on a structure such as a vehicle is shown. The push-pull cable assembly includes a push rod 10 enclosed in a housing 12. The housing 12 is fixable to a vehicle frame member (not shown) such as a control panel or the like. The push rod 10 may be affixed to a cable 11 to provide a degree of flexibility in a similarly formed flexible housing (not shown). The housing 12 is formed with a flared end 14. A first member 16 is formed with an axial bore 17 of sufficient diameter to receive housing 12 therein. First member 16 is further formed with a conical shaped counterbore 18 axially intersecting axial bore 17 and of substantially the same angular configuration as flared end 14 so that conical counterbore 18 may be in abutting and sealing relationship with flared end 14. First member 16 has formed thereabout a threaded surface 20 for receiving a sealing capsule 22.

Sealing capsule 22 serves to sealingly associate push rod 10 with housing 12 to prevent dirt and other foreign particles from reaching the interior of housing 12. Sealing capsule 22 is formed with a bore 24 generally of the same diameter as the interior bore of housing 12. A threaded counterbore 26 is axially aligned with bore 24 and is adapted to threadably engage threaded surface 20 of first member 16. In the void formed by threaded counterbore 26, sealing capsule 22 has formed an axially extended frustoconical portion 28 of substantially the same angular configuration as flared end 14 and for sealing engagement therewith. A cylindrical counterbore 30 is formed at the end opposite threaded counterbore 26 of sealing capsule 22. Cylindrical counterbore 30 is adapted to receive a seal means such as annular seal ring 32 formed to sealingly engage push rod 10 and which may be of elastomeric material. Cylindrical counterbore 30 is formed with a groove 33 proximate the open end thereof to receive seal retainer means such as ring 35 to retain annular seal ring 32 in cylindrical counterbore 30.

Assembled, the push-pull cable assembly is as shown in FIG. 1. In particular, the first member 16 is positioned about housing 12 in the manner shown. If it is envisioned that sealing is necessary at both ends of the push-pull cable assembly then first member 16 would be disposed about housing 12 before the flare 14 is formed in housing 12. Concurrently, the corresponding first member 16 at the other opposite end of the push-pull cable assembly (not shown) would be similarly disposed. Flared end 14 would then be formed and the push rod 10 inserted in housing 12. It should be noted that the fitting 40 shown in FIG. 1 at the extreme end of push rod 10 is representative only and is shown to illustrate a removable fitting on push rod 10. When push rod 10 is disposed in housing 12, the sealing capsule 22 with the annular seal ring 32 disposed therein may be positioned about push rod 12 and threadably engaged with threaded surface 20. Sealing capsule 22 may then be tightened on threaded surface 20 so that the frustoconical portion 28 engages flared end 14 while the conical counterbore 18 is pulled rightwardly as shown in FIG. 1. The use of sealing capsule 22 provides the operator with a readily replaceable element in the push-pull cable assembly. The annular seal ring 32 in sealing capsule 22, which replaces earlier sealing means brazed to the housing, has been found to be the first element in the assembly to fail. Accordingly, replacement of the sealing capsule 22 in this easily adapted configuration provides savings to the operator.

Operation should be readily apparent from the above description of the structure and the assembly thereof. However, it should be noted that the annular seal ring 32 is adapted to allow motion of push rod 10 into and out of housing 12 while preventing dirt and other particles from entering the housing.

DESCRIPTION OF THE ALTERNATE EMBODIMENT

Referring now to FIG. 2, an alternate embodiment is disclosed which includes the limitations of the primary embodiment just described. In particular, a housing 52 has fixedly associated therewith a first member 54 to which a sealing capsule 56 is threadably engaged. Sealing capsule 56 includes seal means 58 disposed in a cylindrical counterbore 60 of the sealing capsule. The seal means 58 serves to sealingly associate the push rod 62 with the housing 52.

In this embodiment first member 54 is shown swaged or pressed onto housing 52. It should be noted that first member 54 could be formed along with housing 52 in the manner described in the primary embodiment, that is with a flared counterbore in first member 54 and a flared end to the housing. Swaging first member 54 to housing 42 permits the easy inclusion of a radial bore 64 communicating with the interior of housing 52. Radial bore 64 is formed with a counterbore 66 in which a conventional grease fitting 67 may be disposed. Use of grease fitting 67 allows the introduction of lubricant into housing 52 to lubricate push rod 62 which, in this embodiment, is shown affixed to flexible cable 68. Use of grease fitting 67, in addition to allowing lubrication of the push rod 62 and flexible cable 68, serves the additional purpose of permitting the introduction of sufficient grease or oil into housing 52 to flush dirt and contaminant from housing 52. By completely filling the housing including the voids therein with lubricant, contaminants are largely excluded and condensation is inhibited.

First member 54 has rigidly affixed thereto sealing capsule 56. In this embodiment, the corresponding threaded surfaces are shown of the tapered variety which is particularly adaptable to the swaged method of assembly. In the event first member 54 is formed with the conical counterbore shown in the primary embodiment, a straight thread also illustrated in the primary embodiment would be applicable. Seal means 58, which is disposed in cylindrical counterbore 60 of sealing capsule 56, is of a particular configuration. The seal means is formed by a plurality of thin annular washer shaped flexible members 70 which may be of elastomeric material. The plurality of flexible members 70 are separated by annular washers 71. Each flexible member 70 has a center hole of dimension smaller than the diameter of push rod 62. The surface adjacent the center hole of each flexible member is coated with a coating 72 of material having a low coefficient of friction, such as a synthetic resin of the fluorocarbon type of which polymerized tetrafluoroethylene is representative (the trademarked material Teflon is representative). The flexible members 70 form a seal to sealingly associate push rod 62 with the housing, however the seal means also includes a resilient washer 73 which may be of stainless steel and which forms a scraper to clean the exterior surface of push rod 62 of dirt, ice and the like. Resilient washer 73 is formed with a bore generally smaller than the diameter of push rod 62 so that disposing of resilient washer 73 about push rod 62 causes the bore to grip the surface of push rod 62 tightly as shown in somewhat exaggerated form in FIG. 2. The entire seal means 58 may be retained in cylindrical counterbore 60 by swaging or working the extreme end of the sealing capsule 56 over into a flange 75 during manufacture. Other means of retaining seal means 58 are equally appropriate and could include the method depicted in FIG. 1 of the primary embodiment, that is utilization of a lock ring in a groove. The particular structure utilized in FIG. 2 has proved particularly helpful in retaining the seal means in the sealing capsule under extremely rugged conditions.

Push rod 62 in this embodiment may be formed with a special surface of material having a low coefficient of friction of the type described above in relation to annular washer 71 and coating 72. In particular, the surface, after special preparation, is coated utilizing conventional methods with an inert synthetic resin material having a low coefficient of friction such as the fluorocarbon resins of which polymerized tetrafluoroethylene is representative.

Referring to FIG. 3, an expanded view of the surface structure of push rod 62 is shown immediately subsequent to coating. The coating method entails the following necessary steps. The surface of the push rod 62 is first knurled, rolled, acid etched or otherwise prepared to produce small sharp peaks 77 and valleys 78. The surface may then be rolled to produce hook like tops 80 from the peaks 77. The push rod 62 is then conventionally coated in a manner well known to the art with the aforesaid synthetic resin or plastic material having a low coefficient of friction. The coating 81 extends slightly above the hook like tops 80 of the prepared metallic surface of the push rod. The hook like tops 80 tend to mechanically hold the synthetic resin material to the surface in a manner not heretofore described.

A second method of coating is shown in FIG. 4 and involves a rod end that is first chrome plated with a plurality of pores formed in the chrome plated surface. The surface is then subjected to a weak acid bath that eats away a portion of the metal under the chrome to form a roughened surface 34. The inert synthetic resin is then conventionally coated over this roughened surface wherein it is mechanically bonded by the cavities created by the acid bath.

In use, in both methods of coating push rod 62, the metal scraper formed by resilient washer 73 initially scrapes off a portion of the synthetic resin coated surface down to the top of the peaks in the embodiment shown in FIG. 3 or down to the chrome surface in FIG. 4, however a majority of surface is left covered with the low friction non-metallic surface material. Since ice and dirt and other foreign material are known not to adhere to surfaces coated with the aforedescribed synthetic resin like material, the force to move the rod inwardly and outwardly of the housing is considerably lessened during rugged operating conditions.

In addition to the introduction of a low coefficient of friction between the push rod and the seal means, the grease fitting 67 which may be added to the housing allows the introduction of oil or grease as heretofore described to further reduce friction between the flexible cable 68 and the housing 52. As previously mentioned lubricant introduced through fitting 67 is introduced until it is seen to be escaping around the resilient washer 73, thus tending to flush out contaminants. It is further pointed out that push rod 62 is formed substantially of the same dimension as flexible cable 68 so that movement inwardly and outwardly of push rod 62 of the housing prevents "pumping" of lubricant by the end of rod 62 in the embodiment wherein the grease fitting is included.

Referring to FIG. 5, a rod 100 is shown enclosed in a housing 102 similar to the rod of housing of the primary embodiment. A first member 104 is affixed to housing 102 by means well known in the art such as brazing/welding or press fitting. The first member 104 is formed with a threaded outer surface 106 on which the second member 108 may be threadably affixed. The first member 104 is further formed with a counter-bore 110 distal of the housing 102 with the first member affixed to the housing. Counter-bore 110 is adapted to receive a plurality of annular washers 112 each formed with a specially adapted material 72''' on the inner bore thereof to form the aforedescribed low friction inter-face between rod 100 and the annular washers 112. These annular washers 112 are the same form as the annular washer shaped flexible member 70 of the primary embodiment and may also be separated by metallic washers in the manner of the primary embodiment. The second member 108 forms a cup-shape cover threadably engageable on first member 104 so that the plurality of annular washers 112 are retained in counterbore 110. This particular embodiment permits replacement of the seal while retaining the cap as opposed to the previously described embodiments wherein the seal is formed in the cap member.

Referring now to FIG. 6 for another embodiment, the first member 118 is formed with a conical counter-bore 120 adapted to engage a flared end 121 of housing 122. First member 118 has a threaded inner surface 124 adapted to receive the threaded outer surface 126 of a second member 128 which has a cone-shaped end 130 adapted to engage the flared end 121 of housing 122. Second member 128 has a counter-bore 132 distal of the cone-shaped end adapted to receive an annular washer-shaped seal 134. Additionally, in this embodiment, a scraper ring 136 may be disposed in the counter-bore 132 in the manner described above. Finally, the end 138 of second member 128 proximate counter-bore 132 may be worked over in a manner well-known in the art to retain the seal 134 and scraper ring 136 within the counter-bore 132.

Operation of both these alternate embodiments is in the manner described above relating to the first alternative embodiment and the primary embodiment.

Although this invention has been shown with particularity relating to four embodiments, it is to be understood that the invention is not to be considered so limited. Modifications and changes to the invention well within the art are to be considered within the purview of this specification and the claims.

What is claimed is:

1. A seal cap assembly for a control cable system, the control cable system including a cylindrical housing having a cable extending therethrough, the seal cap assembly comprising:
   rod means axially disposed in said housing for connection with said cable;
   a first member associated with said housing proximate one end thereof, the rod means extending outwardly of the first member;
   sealing means disposed about the rod means for sealingly associating the rod means with the cylindrical housing so that the rod means is movable therethrough; and
   retention means for removably retaining said sealing means disposed about said rod means relative said first member.

2. The seal cap assembly set forth in claim 1 wherein the retention means comprises:
- a second member defining a bore of sufficient diameter to receive the rod means;
- said second member threadably engageable with said first member;
- said sealing means associated with said second member for forming a seal about said rod means with said second member threadably engaged with said first member.

3. The seal cap assembly set forth in claim 2 wherein the first member defines a threaded outer surface and the second member defines a first threaded counter-bore for engagement with said threaded outer surface and a second counter-bore at the end distal at said first threaded counter-bore, said second counter-bore for receiving the sealing means, the second counter-bore defining a groove there about proximate the open end thereof; and
- wherein the retention means further comprises retainer ring means for retaining the sealing means in the second counter-bore.

4. The seal cap assembly set forth in claim 3 wherein the cylindrical housing defines a flared end, and the first member defines a frustoconical counter-bore formed to engage the flared end of the housing;
- and further wherein the second member is formed with a frustoconical protrusion axially centered in the base of the interior threaded socket to engage the interior of the flared end of the housing when the second member is threadably engaged with the first member.

5. The seal cap assembly set forth in claim 2 wherein the rod means comprises a metallic first portion and a nonmetallic covering; and wherein the first member is rigidly affixed to the housing;
- and further wherein the sealing means is comprised of a plurality of flexible washer members disposed in said second member and about said non-metallic covering, each flexible washer member having a specially formed non-metallic coating in the vicinity of the central bore thereof for cooperating with the non-metallic covering of the rod means to form an interface therebetween having low frictional engagement forces.

6. The push rod assembly set forth in claim 5 further comprising a metallic scraper means disposed in said second member adjacent to and exterior of said plurality of washer members, said metallic scraper means for mechanically cleaning the rod means upon movement of the rod means into and out of the housing assembly.

7. The seal cap assembly as set forth in claim 6 further comprising lubrication access means associated with the first member for providing lubrication to the interior of said housing.

8. The seal cap assembly set forth in claim 2 wherein the first member defines a threaded inner surface and the second member defines a threaded outer surface for engagement with said threaded inner surface of said first member, said second member further defining an annular groove formed in said bore for receiving the sealing means; and,
- scraper ring means disposed in said groove for mechanically cleaning the rod means upon movement of the rod means into and out of the housing assembly.

9. The seal cap assembly set forth in claim 8 wherein the rod means comprises a metallic first portion and a non-metallic covering.

10. The seal cap assembly set forth in claim 1 wherein the first member is rigidly affixed to the housing and further wherein the first member defines a threaded outer surface; and
- wherein the retention means comprises a second member defining a bore of sufficient diameter to receive the rod means and further wherein the second member is threadably engageable with said first member to retain the sealing means disposed therebetween in a sealing arrangement about said rod means.

11. The seal cap assembly set forth in claim 10 wherein the rod means comprises a metallic first portion and a non-metallic covering;
- and further wherein the seal means is comprised of a plurality of flexible washer members, each flexible washer member having a specially formed non-metallic coating in the vicinity of the central bore thereof for cooperating with the non-metallic covering of the rod means to form an interface therebetween having low frictional engagement forces.

12. A seal for a push-pull cable assembly including a rod member having a specially formed non-metallic coating, the seal comprising a shaped flexible washer member having a specially formed non-metallic coating in the vicinity of the central bore thereof, said non-metallic coatings for relatively frictionless reciprocation of said rod member through said seal.

13. A replaceable seal cap assembly for a push-rod assembly, the push rod assembly including a push rod disposed in a cylindrical housing for axial movement therethrough; the replaceable seal cap assembly comprising:
- a first member defining a bore fixedly receivable on the cylindrical housing proximate one end thereof and defining a threaded surface;
- a second member defining a bore of sufficient diameter to receive the push rod and further defining a threaded surface adapted for engagement with the threaded surface of the first member;
- seal means for forming a seal about said push rod with the second member threadably engaged with the first member while said first member is engaged with said housing; and,
- retention means for removably associating said seal means about said rod means relative said second member.

14. The seal cap assembly set forth in claim 13 wherein the second member defines the second counter-bore at the end distal of the threaded counter-bore, said second counter-bore for receiving the seal means, the second counter-bore defining a groove there about proximate the open end thereof; and,
- wherein the retention means comprises a retainer ring adapted to fit said groove for retaining the seal means in said second counter-bore.

15. The seal cap assembly set forth in claim 14, wherein the cylindrical housing defines a flared end, and the first member defines a frustoconical counter-bore formed to engage the flared end of the housing;
- and further wherein the second member is formed with a frustoconical protrusion axially centered in the base of the interior threaded socket to engage the interior of the flared end of the housing when the second member is threadably engaged with the first member.

* * * * *